United States Patent [19]

Underwood

[11] Patent Number: 5,499,948

[45] Date of Patent: Mar. 19, 1996

[54] MODULAR THRESHING ASSEMBLY FOR A COMBINE

[75] Inventor: Mark R. Underwood, Burr Oak, Kans.

[73] Assignee: Deere & Company, Moline, Ill.

[21] Appl. No.: 299,921

[22] Filed: Sep. 1, 1994

[51] Int. Cl.$^6$ .................................................. A01F 12/00
[52] U.S. Cl. ............................................ 460/119; 56/14.6
[58] Field of Search ................................ 460/119, 62, 69; 56/14.5, 14.6

[56] References Cited

U.S. PATENT DOCUMENTS

| 3,616,800 | 11/1971 | Rowland-Hill et al. | |
|---|---|---|---|
| 4,150,525 | 4/1979 | De Busscher et al. | 56/186 |
| 4,846,198 | 7/1989 | Carnewal et al. | 460/21 |
| 5,024,630 | 6/1991 | Harig et al. | 460/21 |
| 5,045,025 | 10/1991 | Underwood | 460/66 |

FOREIGN PATENT DOCUMENTS 5-103533  4/1993  Japan ...................................... 460/119

*Primary Examiner*—Terry Lee Melius
*Attorney, Agent, or Firm*—Grady K. Bergen; James Bradley

[57] ABSTRACT

A combine for harvesting a crop has a threshing assembly with a threshing rotor and a threshing grate. The threshing assembly locates within the framework of the combine. A threshing assembly frame mounts to the threshing assembly and is removably mounted to the framework of the combine so that the threshing assembly is held within the framework. The threshing assembly frame has a support leg for engaging the ground so that the frame and threshing assembly can be supported in a freestanding position when removed from the combine. The frame is oriented in the freestanding position to facilitate mounting of the threshing assembly frame and threshing assembly to the framework. The frame has a pair of side members that are located on opposite sides of threshing assembly which correspond to guide members mounted to the framework. The side members allow the threshing assembly frame to be inserted into and pulled out of the framework of the combine. Forward support members are pivotally mounted to the frame and movable between a raised and lowered position. The forward support members engage the support surface when moved to the lowered position so that the threshing assembly frame and threshing assembly can be pulled from the framework of the combine. Lift means is provided with the forward support member for moving the forward support member between the raised and lowered positions.

18 Claims, 6 Drawing Sheets

MODULAR THRESHING ASSEMBLY FOR A COMBINE

BACKGROUND OF THE INVENTION

1. Field of the Invention

This invention relates in general to agricultural equipment and in particular to a combine for harvesting and threshing crop, and more particularly to a modular assembly which mounts to the combine.

2. Description of the Prior Art

Combines are usually constructed with a header assembly mounted at the forward end of the combine. The header assembly is usually provided with a cutting element for cutting seed or grain bearing crops. Oftentimes a reel is used to facilitate cutting of the crop. The reel rotates about a transverse axis forcing the standing crops toward the cutting element of the header assembly to facilitate cutting of the crop and causing the cut crop to be forced to an auger situated adjacent to the cutting element. The auger gathers the cut crop and directs it to a feed conveyor or elevator which transports the cut crop towards a threshing assembly.

The threshing assembly is usually comprised of a threshing rotor rotatably carried within a threshing drum. The threshing rotor threshes or agitates the cut crop so that the seed or grain is separated from stalks, straw and larger sized crop residue. Typically, the threshing assembly is mounted to the frame of the combine in such a fashion that accessing and removal of the threshing assembly is difficult. Special equipment must be used in order to remove the threshing assembly. This equipment may consist of a hoist which can be attached to threshing assembly so that when the threshing assembly is loosened or dismounted from the frame of the combine, it is supported off the ground. Most of the time the whole header assembly, including the feed conveyor, must be removed from the combine before the threshing assembly can be removed.

The space created in the combine for receiving the threshing assembly is often designed solely for that particular threshing unit. Thus, the combine is limited to only that particular type of threshing unit without modifying the combine.

What is needed is a combine having a modular threshing assembly which can be easily removed from the combine without completely removing the header assembly and without the need for special equipment and which is adapted for use with other threshing assemblies or equipment without necessitating modifying the combine.

SUMMARY OF THE INVENTION

A combine having a longitudinal axis and a framework which is mounted on wheels is provided for harvesting crop. The framework has a forward opening and a threshing assembly which includes a threshing rotor having a longitudinal axis and a threshing grate. The threshing grate surrounds the threshing rotor. The threshing assembly mounts within the framework of the combine and has a forward end for receiving crop to be threshed. Mounted to the threshing assembly is a threshing assembly frame which mounts to the framework of the combine. The threshing assembly frame is provided with a pair of side members which locate on opposite sides of the threshing assembly. A pair of guide members mounted to the framework of the combine cooperate with the side members to guide the frame and threshing assembly into and out of a mounted position.

A support leg for engaging a support surface is provided with the frame. The support leg supports the frame and threshing assembly on the support surface in a freestanding position when removed from the combine so that the frame and threshing assembly are oriented relative to the framework of the combine to facilitate mounting of the frame and threshing assembly to the framework of the combine.

A forward support member pivotally mounts to the frame opposite the threshing assembly. The forward support member is movable between a raised and lowered position. The forward support member engages the support surface when moved to the lowered position when the threshing assembly frame is in the mounted position. Lift means is also supplied for moving the forward support member between the raised and lowered position.

The frame is adapted to receive other equipment assemblies besides the threshing assembly so that the combine can be adapted for other uses such as providing a seed delivery system or pesticide/herbicide application equipment.

DETAILED DESCRIPTION OF THE INVENTION

Figure 1:
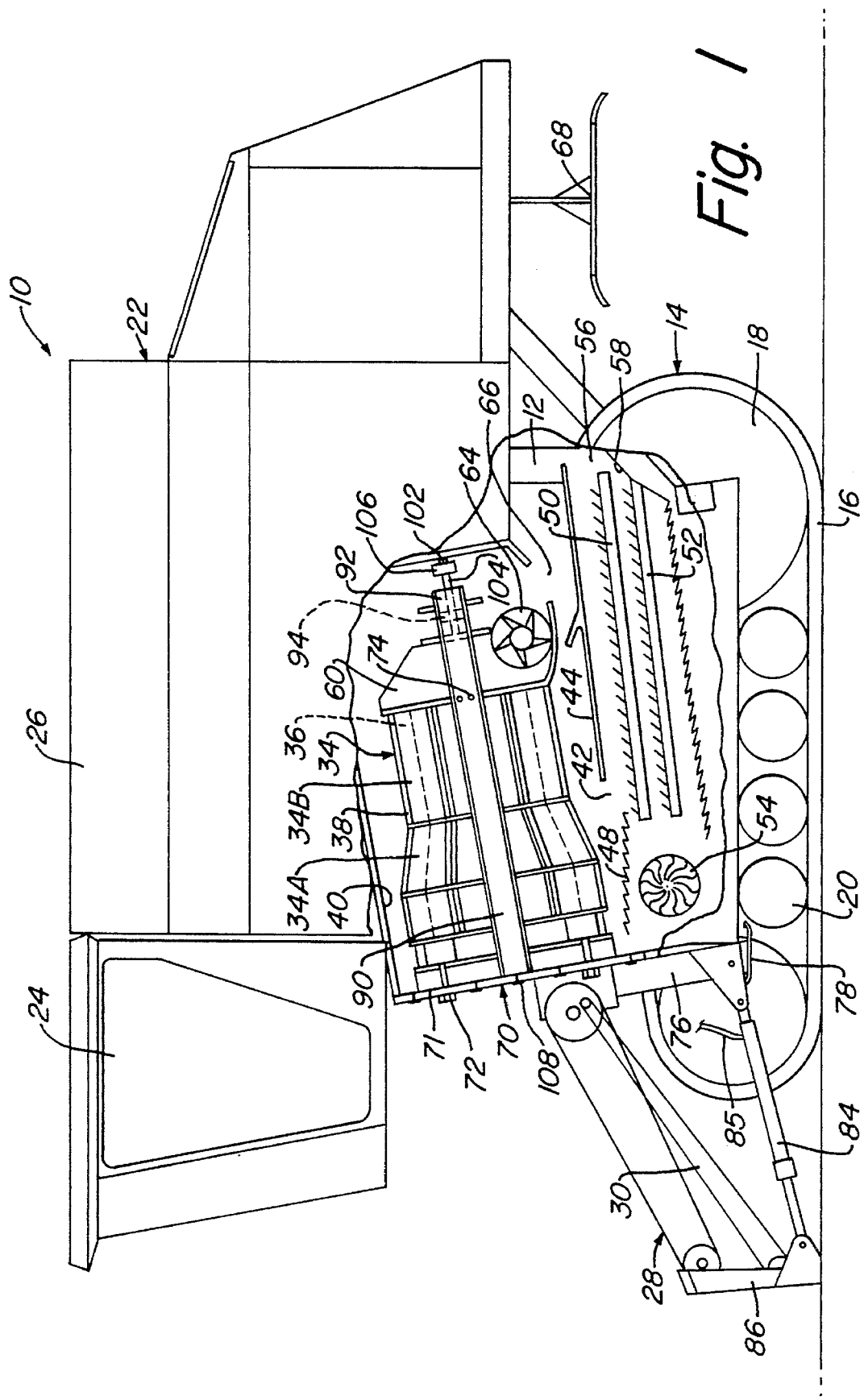
FIG. 1 is a schematic side view of a combine which is partially cut away to view a modular threshing assembly constructed in accordance with the invention.

Referring to the drawings, specifically to FIG. 1, a combine 10 is shown having a framework 12 which is mounted on tracks 14. The tracks 14 are comprised of continuous treads 16 mounted around wheels 18 and rollers 20. The tracks 14 are powered by an engine (not shown) which powers other components of the combine 10 as well. While the combine 10 is driven by tracks 14 in the particular embodiment shown, wheels and tires may also be employed for moving and supporting the combine 10.

Supported on the framework 12 is the body 22 of the combine 10. A control cab 24 is mounted at the forward portion of the combine 10 where an operator controls the operation of the combine 10. To the rear of the control cab 24 is a grain bin 26 for receiving clean grain which is harvested utilizing the combine 10.

A header assembly indicated at 28 is typically located at the forward end of the combine 10 for cutting and collecting crop to be harvested. As seen in FIG. 1, the header assembly 28 is shown with a feed conveyor 30, but without the cutting element, reel, header auger, etc . . . , which would be located immediately forward of the feed conveyor 30. The header assembly 28 gathers the cut crop and directs it by means of the feed conveyor 30 towards a threshing assembly 34 located within the framework 12 and body 22 of the combine 10. The threshing assembly 34 is an axial flow-type threshing assembly having forward threshing section 34A and a rearward separating section 34B. The threshing assembly 34 is formed with a threshing rotor 36 mounted within a threshing grate or drum 38.

The threshing assembly 34 is housed within a threshing assembly housing 40 within the body 22 of the combine and securely mounted to the framework 12. The housing 40 is configured to receive the threshing assembly 34. The threshing assembly housing 40 has a lower opening 42 located within a floor 44 of the housing 40. Small openings or apertures (not shown) of the threshing drum 38 allow grain to fall onto the floor 44 of the threshing assembly housing 40 from the threshing and separating sections 34A, 34B and through the opening 42 located within the floor 44. This threshed grain falls onto a grain pan 48 which directs the threshed grain and crop residue which passes through the threshing drum 38 to primary and secondary sieves 50, 52. A blower 54 located forward of the sieves 50, 52 directs air across the sieves 50, 52 to blow chaff and lighter weight crop residue from the threshed grain rearward and out a rear opening 56 of a sieve housing 58 which surrounds the primary and secondary sieves 50, 52. The heavier grain falls through the primary and secondary sieves 50, 52 to a floor of the sieve housing 58. An elevator (not shown) transports the threshed grain from the floor of the sieve housing 58 to the grain bin 26 which is located above the threshing assembly housing 40.

The threshing rotor 36 has a longitudinal axis extending from a forward end to a rearward end of the threshing rotor 36. The threshing rotor 36 rotates about this axis within the threshing drum 38. As the threshing rotor 36 rotates, cut crop is directed into the threshing portion 34A of the threshing assembly 34 by feed conveyor 30 of the header assembly 28. The cut crop is received between the threshing rotor 36 and the threshing drum 38. The rotation of the threshing rotor 36 causes the grain or seed to be separated from the crop and passed through the apertures of the threshing drum 38 as previously described. The crop residue which remains within the threshing drum 38 eventually is passed rearward through the threshing assembly 34 through a rear threshing drum housing 60 which houses the rearward end of the threshing drum 38. An opening 62 located in the bottom of the threshing drum housing 60 directs the crop residue from the threshing drum 38 to a transverse beater 64 of the threshing assembly 34. The beater 64 rotates and directs the cut crop residue rearward through an opening 66 located in the threshing assembly housing 40 and towards a chaff distributor 68. The chaff distributor 68 spreads crop residue from the opening 66 of the threshing assembly housing 40 and chaff from the opening 56 of the sieve housing 58 evenly over the ground behind the combine 10.

Figure 2:
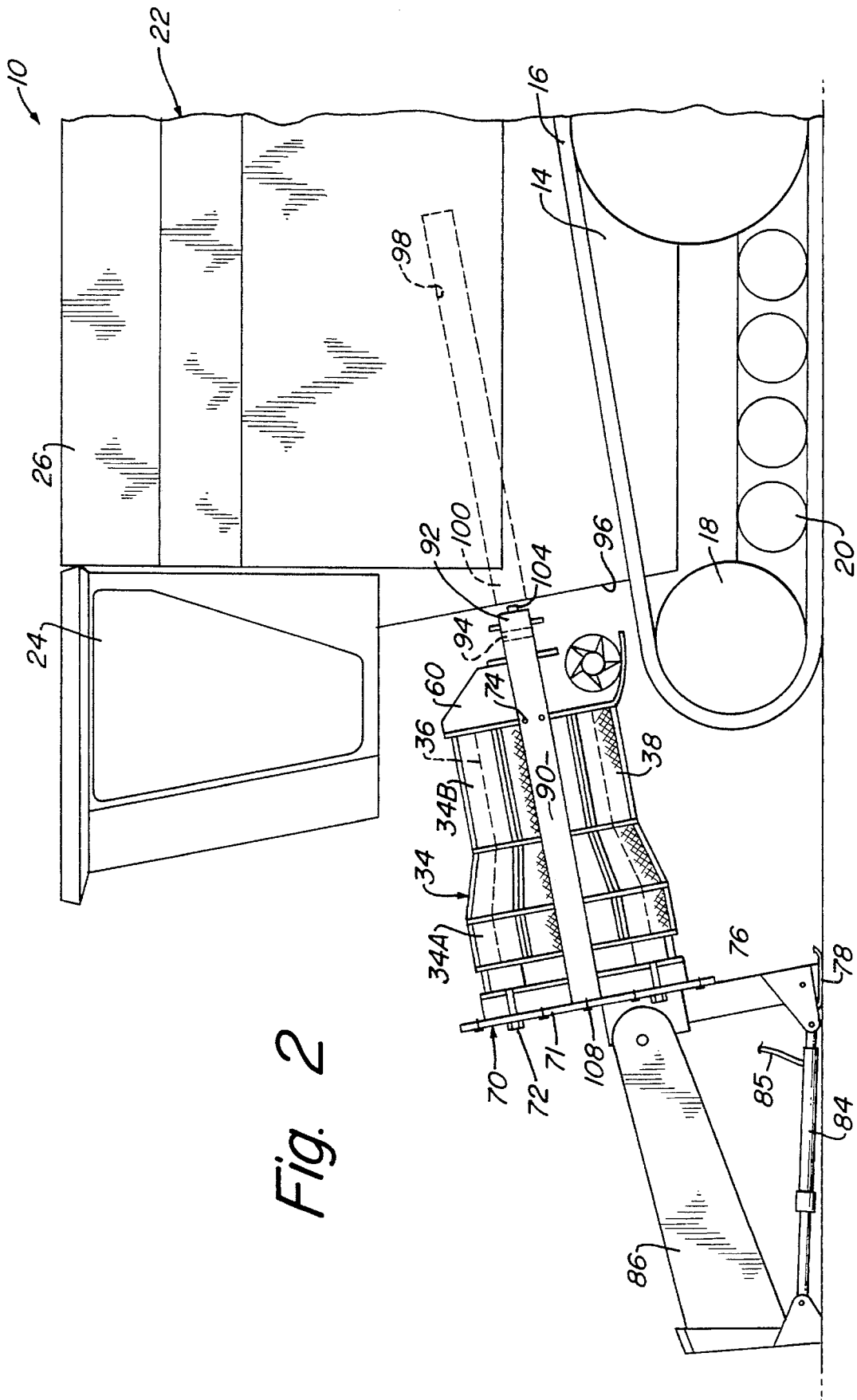
FIG. 2 is a schematic of the combine of FIG. 1 showing the modular threshing assembly pulled away from the combine.
Figure 3:
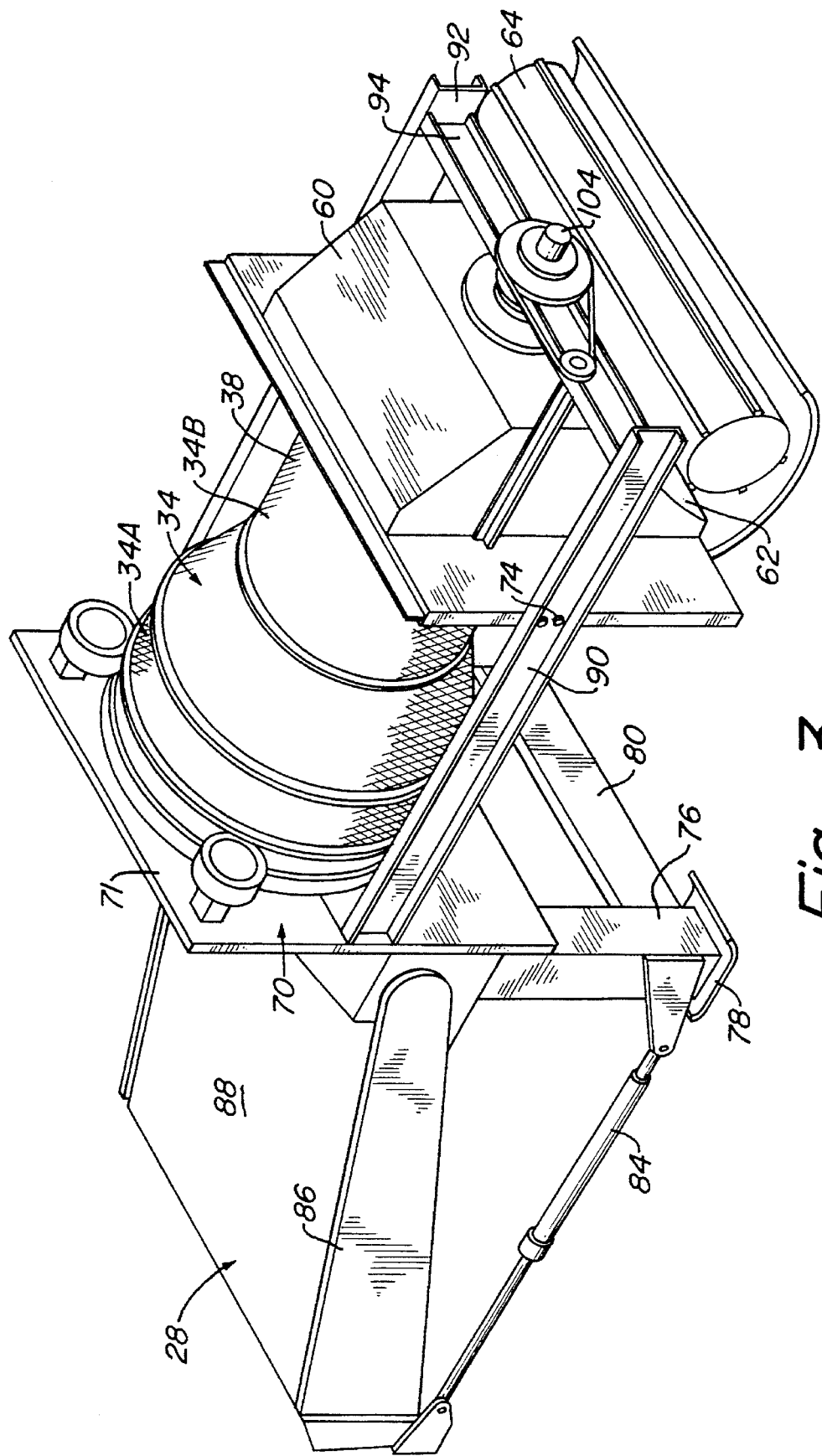
FIG. 3 is a rear prospective view of the modular threshing assembly of FIGS. 1 and 2.

Referring to FIGS. 2 and 3, the threshing assembly 34 is carried on a modular threshing assembly frame 70. As seen in FIG. 2, the frame 70 has a substantially upright portion 71 which is comprised of a rectangular plate having an opening (not shown) for passing cut crop from the header 28 to the threshing assembly 34. The threshing assembly 34 is mounted perpendicularly to the upright portion 71 by means of fasteners 72 which are coupled to the forward end of the threshing drum 38. The upright portion 71 is slightly angled in a plane approximately 10°–15° from a vertical position so that the longitudinal axis of the threshing rotor 36 is angled upward approximately 10°–15° as shown in FIG. 2.

Extending downward from the upright plate 71 are a pair of support legs 76 laterally spaced apart and located opposite each other on each side of the upright plate 71. Each support leg terminates in a sand shoe 78 for resting on the earth or other support surface. A cross member 80 (FIG. 3) extends between the support legs 76 for structural support. Extending forward from the lower end of each of the support legs 76 and pivotally mounted thereto is a hydraulic piston and cylinder 84 which can be extended and retracted from each support leg 76 for raising and lowering forward support arms 86 between raised and lowered positions. The hydraulic piston and cylinders 84 are connected to removable pressure lines 85 for actuating the hydraulic piston and cylinder from the control cab 10.

As seen in FIGS. 2 and 3, the forward support arms 86 are pivotally mounted to the lower end of the plate 71 at each side so that the arms 86 are laterally spaced apart. Each support arm 86 terminates in a forward end which is coupled to a forward end of the piston and cylinder 84 opposite the support legs 76. The elevator portion 30 of the header assembly 28 is mounted between the support arms 86 and is housed within an elevator housing 88. The reel, cutting element, header auger, etc . . . (not shown) which are used on conventional combine header assemblies are mounted to the elevator portion 30 and forward end of the support arms 86.

Extending perpendicularly rearward from the plate 71 are a pair of laterally spaced apart side arms 90 located on opposite sides of the threshing assembly 34. The side arms 90 are substantially parallel to the longitudinal axis of the threshing rotor 36. The side arms 90 are comprised of channel iron having a C-shaped cross section with the legs or free ends of the C-shape extending outwardly away from the threshing assembly 34. The side arms 90 are joined at their forward ends to the plate 71 and are joined together at their rearward ends 92 by a transverse cross member 94. The threshing assembly 34 is supported at its rearward end by the threshing drum housing 60 which is coupled to the side arms 90 by means of the fasteners 74.

Figure 4:
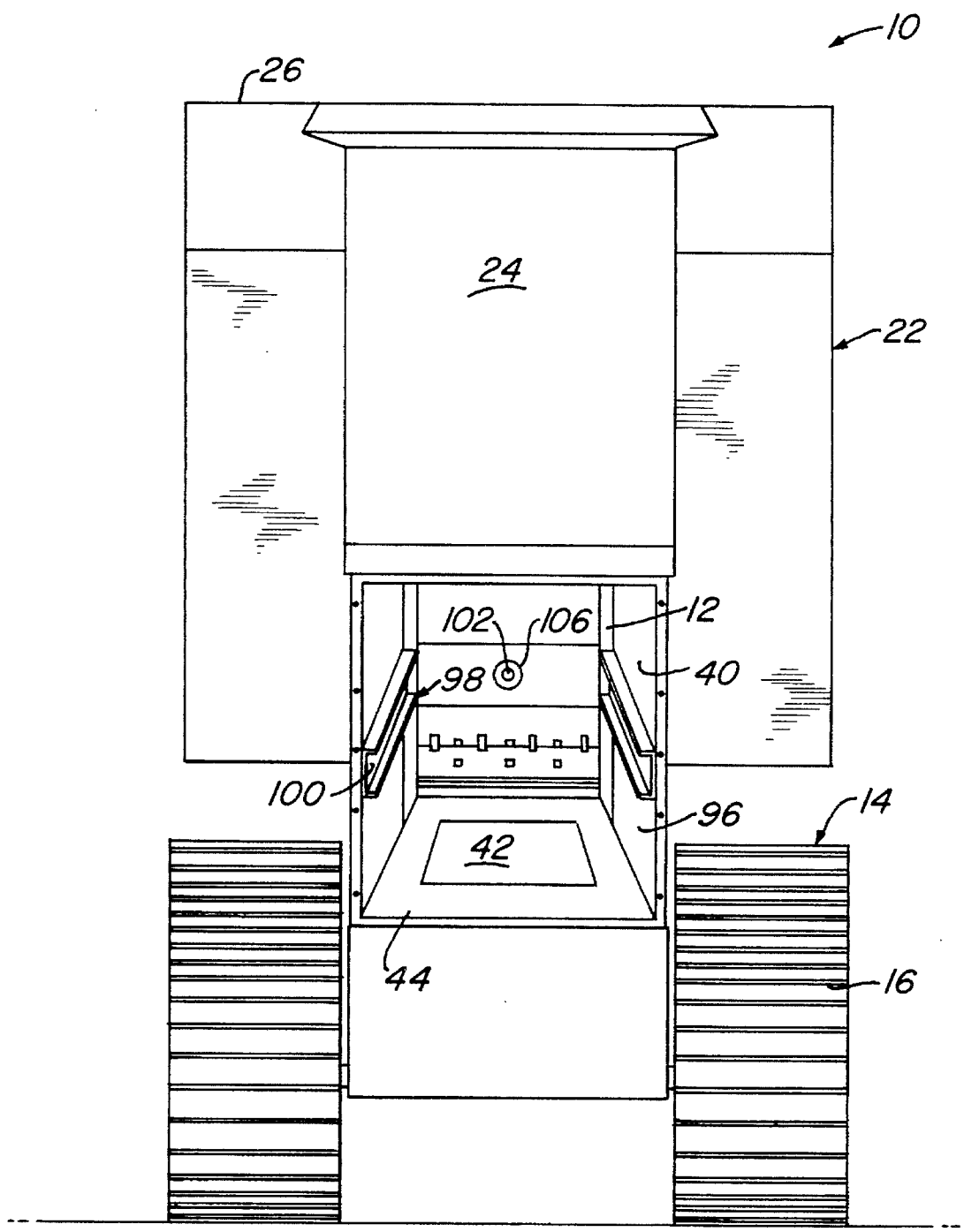
FIG. 4 is a schematic front view of the combine of FIG. 1 with the modular threshing assembly removed from the combine, and showing a threshing assembly housing constructed in accordance with the invention.

Referring now to FIG. 4, the front end of the combine 10 is shown with the threshing assembly 34 and frame 70 removed. The threshing assembly housing 40 has a forward opening 96 which allows the threshing assembly 34 to be removed. Located within the interior of the threshing assembly housing 40 and mounted to the framework 12 of the combine 10 are a pair of tracks 98, each located on opposite sides of the threshing assembly housing 40. The tracks 98 are parallel to each other and are formed from channel iron having a C-shaped cross section which is welded, bolted or otherwise secured to the framework 12 within the interior of the housing 40 with the legs of the channel iron projecting inward. The tracks 98 slope upward from a forward end 100 located adjacent to the forward opening at an angle corresponding to the slope of the side arms 90 of the frame 70 when the frame is supported on the ground by the support legs 76 in a freestanding, resting position.

The rearward end of the threshing assembly housing 40 accommodates a drive shaft 102 which projects into the threshing assembly housing 40 a selected distance. The drive shaft 102 is rotatably driven by the engine (not shown) for coupling to an axial shaft 104 (FIGS. 1–3) of the threshing rotor 36. A spline-type coupler 106 is provided for coupling the shaft 104 of the threshing rotor 36 to the drive shaft 102 of the combine 10.

The frame 70 and threshing assembly 34 are mounted within the housing 40 by coupling the upright plate 71 to the forward end of the threshing assembly housing 40 by means of bolts or fasteners 108. Each side arm 90 is received between the inwardly projecting legs of the C-shaped channel forming the tracks 98 so that the side arms 90 are supported on the tracks 98 when the frame 70 and threshing assembly 34 are in a mounted position. The axial shaft 104 of the threshing rotor also couples to the drive shaft 102 by the spline coupling means 106 when in this mounted position.

The modular threshing assembly is removed from the combine 10 in the following manner. With the threshing assembly 34 and frame 70 mounted to the combine 10 as shown in FIG. 1 and described above, the forward support arms 86 are lowered by means of the hydraulic piston and cylinder 84 to a lowered position. If a reel and cutting element (not shown) of the header assembly 28 are mounted to the support arms 86, these may be removed so that the forward support arms 86 contact the ground or other suitable support surface. Once the support arms 86 are lowered, the hydraulic fluid lines 85 for activating the hydraulic piston and cylinders 84 are uncoupled. The fasteners 108 are then loosened and removed to uncouple the plate 71 of the frame 70 from the forward end of the housing 40.

Figure 5:
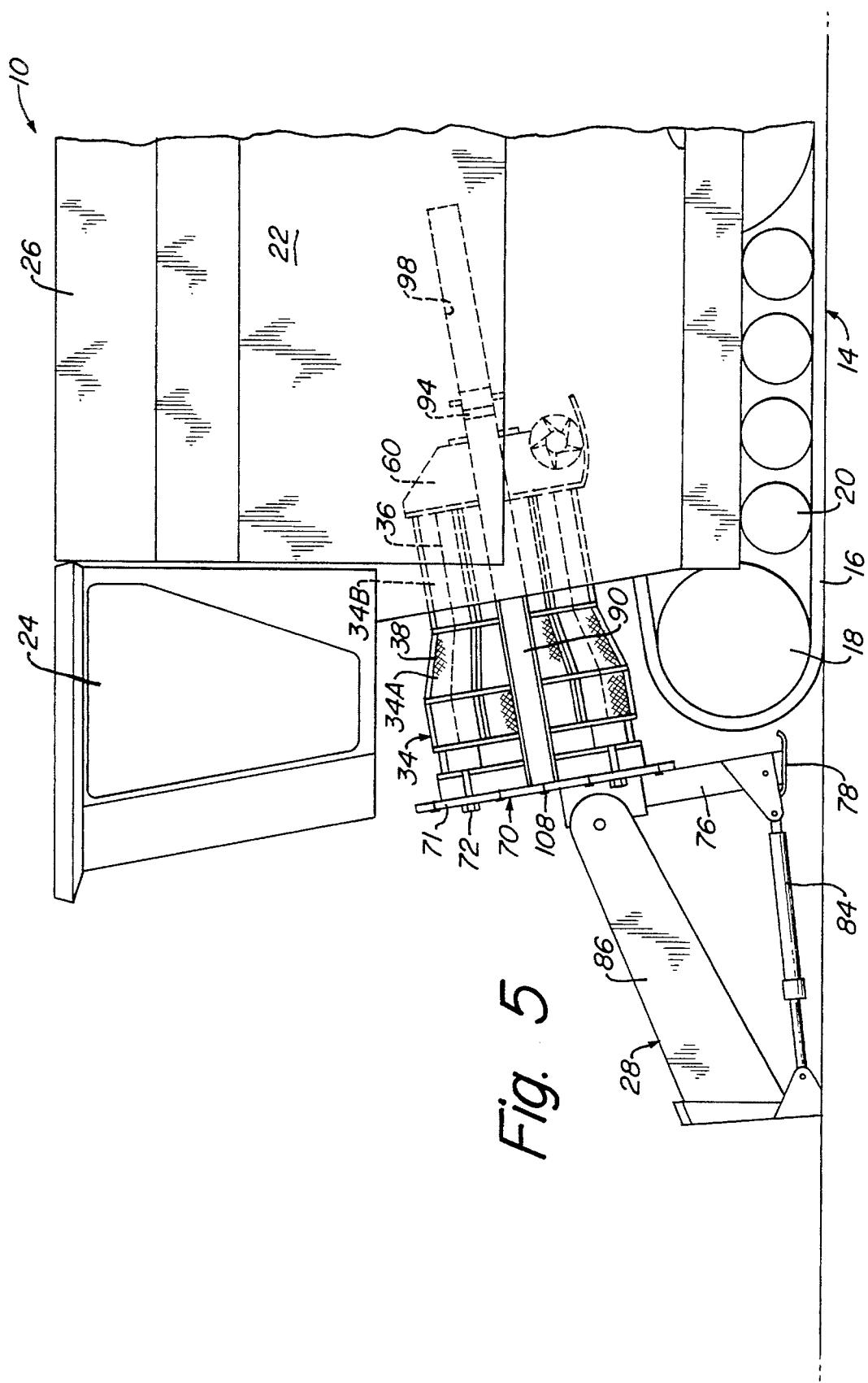
FIG. 5 shows a schematic side view of the combine of FIGS. 1 and 2 showing the modular threshing assembly partially/pulled from the combine.

The combine 10 is then backed away along a linear path from the support arms so that the threshing assembly 34 and frame 70 are pulled away from the combine 10 as shown in FIG. 5. The weight of the support arms 86 against the ground or support surface creates a frictional force sufficient to maintain the frame 70 and threshing assembly 34 in a stationary position over the ground as the combine 10 is backed away. The spline coupling 106 disengages the rotary shaft 104 of the threshing rotor 36.

Because the tracks 98 and side arms 90 are sloped downward toward the forward opening 96, the threshing assembly 34 and frame 70 are gradually lowered along the tracks 98 as the combine 10 is backed away from the forward support arms 86. As the combine 10 continues to back away, the threshing assembly 34 and frame 70 are eventually pulled away from the housing 40 of the combine 10 through the forward opening 96. As this occurs, the support legs 76 engage the ground as shown in FIG. 2. The support legs 76 are of sufficient length to engage the ground surface as the rearward end 92 of the side arms 90 are completely pulled from the forward ends 100 of the tracks 98 so that the threshing assembly frame 70 and threshing assembly 34 are in a resting, freestanding position. The threshing assembly 34 can thus be accessed for maintenance or repair. Likewise, the interior of the threshing assembly housing 40 can also be easily accessed.

It should be noted that the weight of the forward support arms 86 and header assembly 28 is sufficient to counterbalance the weight of the threshing assembly 34 so that the threshing assembly 34 does not pivot about the support legs 76. When in the freestanding position, the frame 70 supports the threshing assembly 34 off of the ground. The side arms 90 are also maintained in their sloped position for insertion into the tracks 98 of the housing 40.

In order to remount the threshing assembly 34 and frame 70 to the combine 10, the combine 10 is merely positioned so that the tracks 98 are aligned with the side arms 90 of the frame 70. The combine 10 is then moved forward so that the side arms 90 are received within the tracks 98 as previously described. As the combine 10 is moved further forward, the tracks 98 guide the side arms 90 upward, as shown in FIG. 4, until the drive shaft 104 of the threshing rotor 36 couples to the drive shaft 102 of the combine 10 by means of the spline coupling 106 and the upright portion 71 of the frame 70 abuts the front of the housing 40. The fasteners 108 are then resecured so that the frame 70 is securely fastened and mounted to the combine 10 in the mounted position. The hydraulic lines 85 are reconnected to the piston and cylinder 84 for controlling the operation of the forward support arms 86. A reel and cutting assembly (not shown) may also be mounted to the forward end of the header assembly 28 and support arms 86. The combine 10 can then be used in a conventional fashion.

Figure 6:
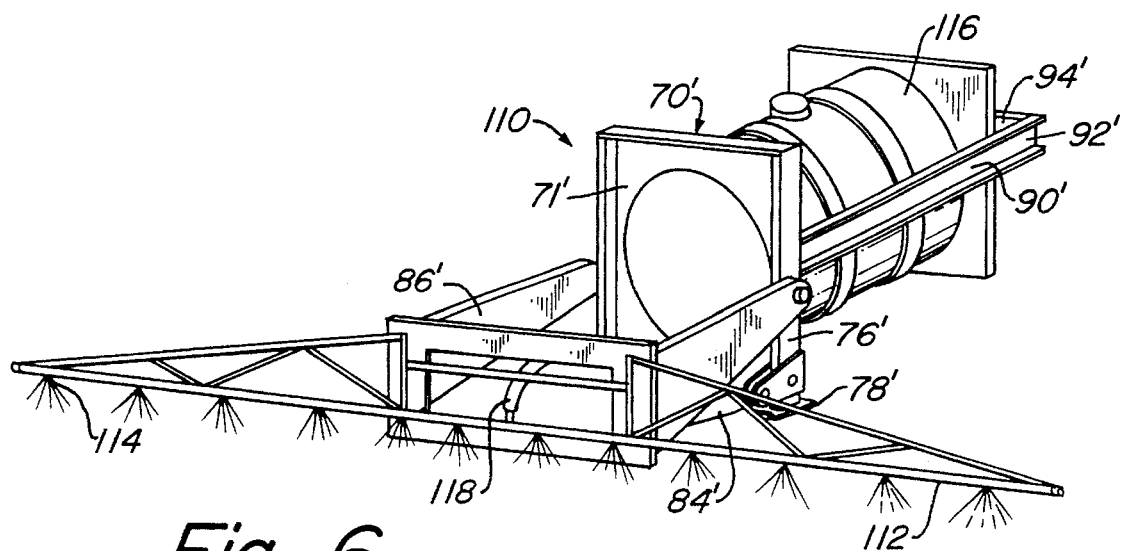
FIG. 6 is a schematic perspective view of a modular spray assembly which can be used with the combine of the invention.

FIG. 6 shows a modular spray assembly 110 that can be utilized with the combine 10 of FIGS. 1–5. The spray assembly 110 is provided with a frame 70' which is constructed similarly to the frame 70 of the embodiment of FIGS. 1–3 and 5. Similar components are designated with the same numeral and a prime sign. The spray assembly 110 can be interchanged with the threshing assembly 34. The spray assembly 110 is comprised of a transverse spray bar 112 that mounts to the forward end of support arms 86'. The spray bar 112 has a plurality of spray nozzles 114 which are positioned at various intervals along the length of the spray bar 112. A cylindrical tank 116 is mounted to the frame 70' in a similar fashion as the threshing assembly 34. The tank is sized to fit within the threshing assembly housing 40 of the combine 10. A fluid conduit 118 leads from the tank 116 to the spray bar 112 for supplying fluids such herbicides, pesticides, etc . . . to the spray nozzles 114. A pump (not shown) may also be mounted to the frame 70' which is adapted to connect to the drive shaft 102 of the combine 10 in order to pressurize the fluids for pumping through fluid conduit 118 to the spray bar 112. The spray assembly 110 is mounted and unmounted to the combine 10 in a similar fashion to the threshing assembly 34.

Figure 7:
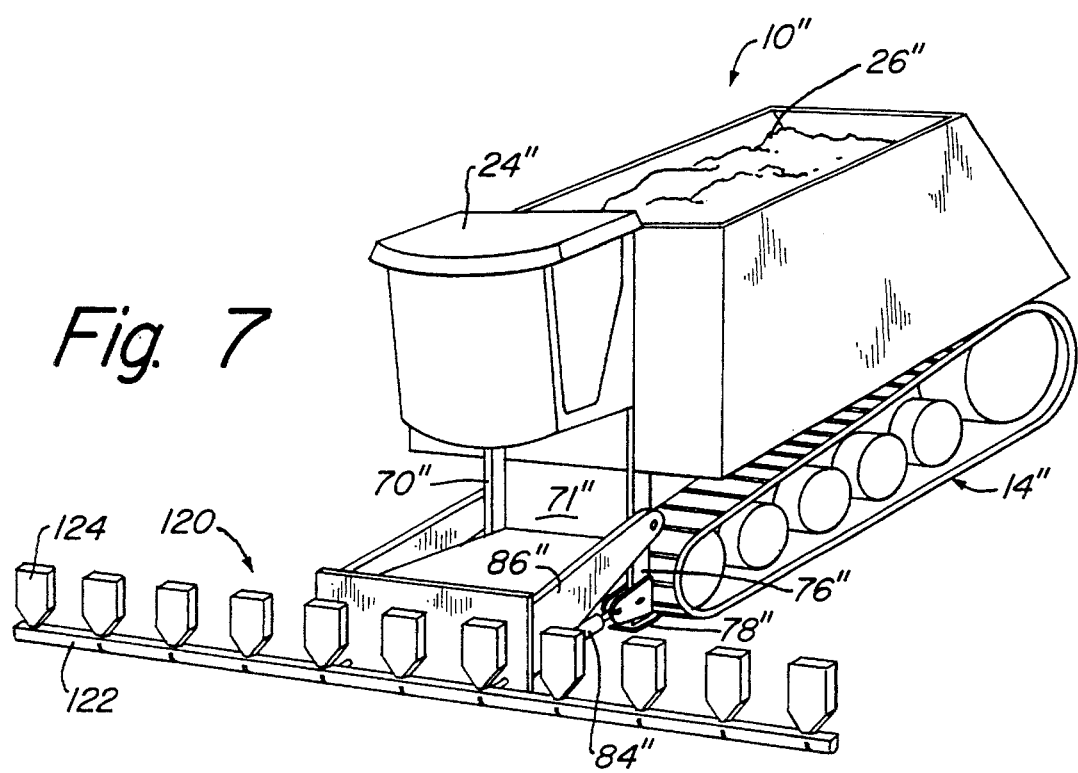
FIG. 7 is schematic perspective view of a modular seed distribution apparatus which can be used with the combine of the invention.

FIG. 7 shows still another embodiment in which a seed distributor or planter 120 is mounted to a combine utilizing the frame 70". The frame 70" is also similar in construction to the frame 70. FIG. 7 shows a transverse seed distribution bar 122 mounted to the forward end of the support arms 86" for carrying seed containers 124 mounted thereon. A tank, such as tank 116 of FIG. 6, could also be used for delivering liquid chemicals to injectors (not shown) adjacent to the containers 124. The liquid would be injected simultaneously with the seed. Seeds could also be stored within the bin 26 and be pneumatically conveyed to the containers 124 to replenish the seeds being dispensed from the containers 124.

The combine of this invention has several advantages over the prior art. The threshing assembly is easily removed from the framework of the combine by merely unbolting the threshing assembly frame and backing the combine away so that the threshing assembly is pulled from the combine. There is no need to remove the feed conveyor of the header assembly. Because the frame supports the threshing assembly off the ground there is no need to utilize a hoist or other special equipment to lift the threshing assembly. The threshing assembly is also is easily mounted to the combine by merely driving the combine up to the threshing assembly so that the side arms are guided into the tracks of the threshing assembly housing. The threshing assembly frame may also be utilized with other equipment assemblies so that the combine can perform multiple functions.

While the invention has been shown in only some of its forms, it should be apparent to those skilled in the art it is not so limited but is susceptible to various changes without departing from the scope of the invention.

I claim:

1. In a combine for harvesting crop, the combine having a longitudinal axis and a framework mounted on wheels, the improvement comprising in combination:

a threshing cavity extending longitudinally within the framework of the combine;

a threshing assembly including a threshing rotor;

a threshing assembly frame to which the threshing assembly is rotatably mounted; and guide means provided with the threshing assembly frame and framework of the combine for sliding the threshing assembly frame and threshing assembly into and out of the cavity between a mounted position and a removed position; and wherein the threshing assembly frame is configured to engage a support surface when the threshing assembly is removed from the cavity so that the frame and threshing assembly are in a freestanding, self supporting position.

2. The combine of claim 1, wherein:

the threshing assembly frame has a support leg for engagement with the support surface.

3. The combine of claim 1, wherein:

the guide means is comprised of a pair of side members joined to the threshing assembly frame which are each located on opposite sides of the threshing assembly, and a pair of guide members mounted to the framework, the side members and guide members cooperating with one another to slide the threshing assembly into and out of the mounted position.

4. The combine of claim 1, further comprising:

a forward support member pivotally mounted to the frame, the forward support member being movable between a raised and lowered position, the forward support member engaging the support surface when moved to one of the raised and lowered positions when the threshing assembly frame is in the mounted position so that the threshing assembly frame and threshing assembly can be pulled from the mounted position; and lift means for moving the forward support member between the raised and lowered position.

5. The combine of claim 1, wherein:

the threshing assembly has a rotatable shaft for rotating the threshing rotor; and the framework has a splined drive coupling which locates at a rear end of the cavity for coupling to the rotatable shaft of the threshing assembly when the threshing assembly is in the mounted position.

6. The combine of claim 1, wherein:

the threshing assembly has a forward threshing portion, a separating portion and a beater portion.

7. In an axial flow combine for harvesting crop, the combine having a longitudinal axis and a framework mounted on wheels, the improvement comprising:

a threshing assembly cavity extending longitudinally within the framework of the combine;

a threshing assembly including a threshing rotor having a longitudinal axis, the threshing assembly locating within the cavity of the framework of the combine, the threshing assembly having a forward end for receiving crop to be threshed and a rearward end;

a threshing assembly frame to which the threshing assembly is rotatably mounted, the threshing assembly frame having a support leg for engaging a support surface and having a pair of side members which are located on opposite sides of the threshing assembly;

a pair of guide members mounted to the framework, the side members and guide members cooperating with one another to slide the threshing assembly frame and threshing assembly into and out of the cavity between a mounted position and a removed position;

a forward support member pivotally mounted to the frame opposite the threshing assembly, the forward support member being movable between a raised and lowered position, the forward support member engaging the support surface when moved to one of the raised and lowered positions when the threshing assembly frame is in the mounted position so that the threshing assembly frame and threshing assembly can be pulled from the mounted position, the support leg engaging the support surface as the threshing assembly frame and threshing assembly are pulled from the mounted position to a removed position so that the frame and threshing assembly are in a freestanding, self supporting position; and lift means for moving the forward support member between the raised and lowered position.

8. The combine of claim 7, wherein:

the side members are parallel side arms which extend along either side of the threshing assembly parallel to the longitudinal axis of the threshing rotor; and the guide members are parallel, linear tracks mounted to the framework on opposite sides of the cavity, each track engaging one of the side arms of the threshing assembly frame for sliding the threshing assembly out of and into the framework of the combine during mounting and removal.

9. The combine of claim 7, further comprising:

a header assembly mounted to the forward support member for cutting and feeding crop to the threshing assembly.

10. The combine of claim 7, wherein:

the threshing assembly has a rotatable shaft for rotating the threshing rotor; and the framework has a splined drive coupling which locates at a rear end of the cavity for coupling to the rotatable shaft of the threshing assembly when the threshing assembly is in the mounted position.

11. The combine of claim 7, wherein:

the threshing assembly has a threshing portion, a separation portion and a beater portion.

12. The combine of claim 7, wherein:

the support member includes a pair of forward extending support arms, each having a free end opposite the threshing assembly frame; and the lift means includes a hydraulic piston and cylinder coupled between the support leg and a free end of each support arm.

13. The combine of claim 7, wherein:

the framework has a forward opening;

the side members are parallel side arms which extend along either side of the threshing assembly parallel to the longitudinal axis of the threshing rotor; and the guide members are parallel tracks mounted to the framework which are inclined downward toward the forward opening, each track engaging one of the side arms of the threshing assembly frame for sliding the threshing assembly out of and into the mounted position through the forward opening.

14. In an axial flow combine for harvesting crop, the combine having a longitudinal axis and a framework mounted on wheels, the improvement comprising:

a threshing assembly cavity extending longitudinally within the framework of the combine and having a forward opening;

a threshing assembly including a threshing rotor having a longitudinal axis, the threshing assembly locating within the cavity of the framework of the combine, the threshing assembly having a forward end for receiving crop to be threshed and a rearward end;

a frame to which the threshing assembly is rotatably mounted, the frame having a pair of rearward extending side members located on opposite sides of the threshing assembly, the frame having a support leg for engaging a support surface;

a pair of guide members mounted to the framework of the combine, the side members and guide members cooperating with one another to slide the frame and threshing assembly into and out of the cavity between a mounted position and a removed position with the threshing assembly passing through the forward opening;

a forward support member pivotally mounted to the frame opposite the threshing assembly, the forward support member being movable between a raised and lowered position, the forward support member engaging the support surface when moved to the lowered position when the frame is in the mounted position so that the frame and threshing assembly can be pulled from the mounted position, the support leg engaging the support surface as the frame and threshing assembly are pulled from the mounted position so that the frame and threshing assembly are supported in a freestanding, self supporting position;

a header assembly mounted to the forward support member for cutting and feeding crop to the threshing assembly; and lift means for moving the forward support member between the raised and lowered position.

15. The combine of claim 14, wherein:

the side members are parallel side arms which extend along either side of the threshing assembly parallel to the longitudinal axis of the threshing rotor; and the guide members are parallel tracks mounted to the framework, each track engaging one of the side arms of the threshing assembly frame for sliding the threshing assembly out of and into the mounted position.

16. The combine of claim 14, wherein:

the side members are parallel side arms which extend along either side of the threshing assembly, the side arms being inclined in a downward direction toward the support arms; and the guide members are parallel tracks mounted to the framework which are inclined downward toward the forward opening, each track engaging one of the side arms of the threshing assembly frame for sliding the threshing assembly upward into the framework of the combine during mounting and downward through the forward opening of the cavity.

17. The combine of claim 14, wherein:

the threshing assembly has a threshing portion, a separating portion and a beater portion.

18. A method of installing and removing a threshing assembly from a combine having a longitudinal axis and a framework mounted on wheels, the method comprising the steps of:

providing a threshing cavity extending longitudinally within the framework of the combine, with the framework having a guide member mounted thereto;

rotatably mounting the threshing assembly to a frame so that the threshing assembly and frame are in a freestanding, self supporting position, the frame of the threshing assembly having a guide engagement member;

moving the frame and threshing assembly into the cavity with the guide member and guide engagement member cooperating with one another so that the frame and threshing assembly are moved to a mounted position; and moving the frame and threshing assembly out of the cavity so that the frame and threshing assembly are in the freestanding, self supporting position.

* * * * *